(12) United States Patent
Yde-Andersen et al.

(10) Patent No.: US 6,246,508 B1
(45) Date of Patent: Jun. 12, 2001

(54) HIGH VOLTAGE ELECTROCHROMIC DEVICE

(75) Inventors: Steen Yde-Andersen; Marine Consigny, both of Odense (DK)

(73) Assignee: Danionics A/S, Odense (DK)

( * ) Notice: Subject to any disclaimer, the term of this patent is extended or adjusted under 35 U.S.C. 154(b) by 0 days.

(21) Appl. No.: 09/242,213

(22) PCT Filed: Aug. 8, 1997

(86) PCT No.: PCT/DK97/00328

§ 371 Date: May 26, 1999

§ 102(e) Date: May 26, 1999

(87) PCT Pub. No.: WO98/07067

PCT Pub. Date: Feb. 19, 1998

(30) Foreign Application Priority Data

Aug. 8, 1996 (DK) .............................. DK 0840/96

(51) Int. Cl.$^7$ .................................................. G02F 1/153
(52) U.S. Cl. .................... 359/270; 359/265; 429/303; 429/317; 429/307
(58) Field of Search .................... 359/265, 266, 359/270, 271, 273; 429/303, 317, 309, 331, 332, 307

(56) References Cited

U.S. PATENT DOCUMENTS

| | | | |
|---|---|---|---|
| 4,427,267 | * 1/1984 | Collins et al. | 359/270 |
| 4,645,307 | * 2/1987 | Miyamoto et al. | 359/270 |
| 4,737,424 | * 4/1988 | Tobishima et al. | 429/331 |
| 4,773,740 | * 9/1988 | Kawakami et al. | 359/270 |
| 4,793,695 | * 12/1988 | Wada et al. | 359/270 |
| 5,016,991 | * 5/1991 | Mason | 359/265 |
| 5,192,629 | * 3/1993 | Guyomard et al. | 429/332 |
| 5,206,756 | * 4/1993 | Cheshire | 359/270 |
| 5,240,790 | * 8/1993 | Chua et al. | 429/303 |
| 5,266,422 | * 11/1993 | Reusch et al. | 429/309 |
| 5,307,201 | 4/1994 | Passerini et al. | 359/270 |
| 5,326,657 | * 7/1994 | Suga et al. | 429/317 |
| 5,864,420 | * 1/1999 | Udaka et al. | 359/270 |

FOREIGN PATENT DOCUMENTS 62-67589 9/1994 (JP) .
WO 96/18215 6/1996 (WO) .

* cited by examiner

Primary Examiner—Loha Ben
(74) Attorney, Agent, or Firm—Darby & Darby

(57) ABSTRACT

Disclosed herein is a high voltage electrochromic device comprising a number of electrodes, a non-aqueous electrolyte system, said system comprising one or more alkali and/or ammonium salts and a solvent in the form of one or more ortho-, meta- or para-phthalates. Also disclosed is a method for producing said electrochromic devices and the use of phthalate based electrolyte systems in electrochromic devices.

30 Claims, No Drawings

HIGH VOLTAGE ELECTROCHROMIC DEVICE

The present invention relates to high voltage electrochromic devices, and particularly to the electrolyte used therein.

Electrochromic devices are electrochemical devices the colour and/or the radiation transmission of which are changed upon changing the device potential applied.

The recent development within electrochemical technology has revealed systems like primary and secondary batteries, capacitors and electrochromic devices of high cell voltages, e.g. the systems based on lithium known in the art. These high voltage electrochemical devices are devices having an operational positive electrode potential above 2 V vs. Li/Li$^+$.

For the above mentioned systems one of the limiting factors for their performance has been their low electrolyte electrochemical stability, i.e. that the components of the electrolyte system are irreversibly oxidised, reduced or decomposed as a result of the strong oxidation/reduction-forces implied by the high cell voltage. This subject is referred to as voltage stability, and the voltage range in which the an electrolyte system is stable is referred to as the voltage stability window.

When the electrolyte system of an electrochemical device is damaged by irreversible oxidation or reduction the performance of the system is reduced accordingly and the system is eventually rendered unusable.

As a number of these systems are meant for continued use, involving multiple charging/discharging cycles and because the effect of irreversible degradation is cumulative, it is crucial that the electrolyte system provides excellent voltage stability to ensure acceptably long life times for these systems.

In e.g. lithium based systems electrode potentials for the positive electrode of 4.5V vs. Li/Li$^+$ are observed for a number of the above mentioned applications, and, when combined with Li-based negative electrode structures of approx. 0 V vs. Li/Li$^+$, a voltage stability window in excess of 4.5V is required to prevent the electrolyte system from deteriorating.

Electrochromic devices, which are also referred to as variable transmission windows or "smart windows", are as mentioned above transparent electrochemical systems, the colour of which can be controlled upon variation of the applied potential. Upon change of colour the transmission properties of the system components are changed, for visible light as well as for other solar radiation frequencies.

Electrochromic devices may be based on combinations of a number of materials. The transmission variation may be based on the colour variation of a single component, however, potentially two or more components may change colour simultaneously upon potential variation.

The colour and transmission variation should be fast. In practical use, e.g. for its application in buildings the response time should be in the seconds or tens of seconds range. Also the colour and transmission variation should be uniform for the entire surface area of the electrochromic device. Further, the variation should be fully reversible; variable transmission windows should be coloured and bleached thousands of times without loss of performance.

The common electrochromic device is based on a working glass electrode of tungsten trioxide, $WO_3$, which is colourless at high potentials and blue at low potentials. The working potential range for tungsten trioxide is approx. 1–4 V vs. Li/Li$^+$. At 1–2 V vs. Li/Li$^+$ counterions like Li$^+$ are intercalated into the structure, which in this potential range is blue. At higher potentials, say in the range 2–4 V vs. Li/Li$^+$, those counterions are desintercalated from the structure. The "empty" structure of tungsten trioxide is colourless.

Traditionally, a glass electrode based on nickel oxide, $NiO_x$, is used as counter electrode. Being light brown at high potentials, nickel oxide is transparent at low potentials, say when combined with the bleached tungsten trioxide. The operational potential range for the nickel oxide electrode is similar to the range of the tungsten trioxide, say 1–4 V vs. Li/Li$^+$.

In the electrochromic device both of these electrodes are coated onto thin layers of a transparent current collector. Such current collectors are traditionally based on indium tin oxide (ITO) films, which are indium oxide films doped with approx. 10% of tin.

Sandwiched between those electrode-current collector systems is the electrolyte. The complete electrochromic device is therefore formed from one working electrode-current collector unit, one counter electrode-current collector unit and the electrolyte. In a final window assembly, the electrochromic device may be covered with a transparent protective layer and placed on top of one layer of glass or be confined between two layers of glass.

The operational voltage range of electrochromic devices may be (−2.3 V)–(+2.3 V), or may be as broad as (−3.0 V)–(+3.0 V), corresponding to the full stability window of the electrodes.

The electrode operational potentials reflect the stability demands for the electrolyte of the electrochromic device. Upon polarisation, the maximum operation potential of the working electrode is in the range of 4–4.5V vs. Li/Li$^+$. At such high potentials, electrolyte components may be oxidised. Similar, at low potentials, components may be reduced. Both of these processes may lead to irreversible decomposition of the electrolyte components resulting in gassing and eventually system failure.

The voltage stability requirements are valid in the short term as well as in the long term. In the short term, decomposition of unstable components may lead to cell failure. However, also long term stability is required, as electrochromic devices should be charged and discharged thousands of times. Under such conditions, even the smallest instability will lead to slow decomposition, which over time will lead to functional failure of the electrochromic device.

Traditionally, the electrolytes of high voltage electrochemical devices have been organic carbonate-based electrolytes, which provide electrochemical stability of approximately 4 V. Such electrochemical device is e.g. described in WO patent application no. 9500502, which describes batteries, capacitors and electrochromic devices having an acceptable stability against oxidation as well as against reduction. However, as indicated above there exists a need for alternative electrochromic devices being stable at even higher potentials.

U.S. Pat. No. 5,266,422 describes an electrolyte for use in batteries comprising a polyhydroxyalkanoate polymer and a salt. Optionally the electrolyte may comprise a plasticizer, e.g. dibutyl phthalate, for improving the film forming process and to increase the conductivity.

JP-A-03,084,808 of Yuasa Battery Co Ltd. describes a high stability solid polymer electrolyte based on a salt dissolved in one or more solvents selected from tetrahydrofuran, 2-methyl tetrahydrofuran, 1,3-dioxalane, 4,4-dimethyl-1,3-dioxalane, γ-butyrolactone, ethylene carbonate, propylene carbonate, methyl bis(3-methoxyethyl)ether a.o. The electrolyte is used for the manufacture of primary and secondary batteries, capacitors, electrochromic devices and electrochemical sensors.

For long term operation, however, the electrolyte solvents of JP-A-03,084,808 do not provide electrochemical stability beyond 4 V vs. Li/Li$^+$.

Japanese laid open application No. 6-267589 discloses a rechargeable non-aqueous battery comprising an electrolyte system based on an electrolyte salt dissolved in ethylene carbonate and an organic solvent having a melting point below −20° C. and a boiling point above 160° C., said electrolyte system having improved charging and discharging characteristics in terms of improved thermal stability. The organic solvent is mentioned as e.g. being diethyl phthalate.

However, no-one has so far suggested an electrolytic composition suitable for use in an electrochromic device and having the desired properties regarding voltage stability.

Accordingly, it is an object of the present invention to provide high voltage electrochromic devices having good voltage stability, i.e. electrochemical stability against oxidation as well as against reduction.

This object is accomplished by high voltage electrochromic devices comprising a number of electrodes, a non-aqueous electrolyte system, said system comprising one or more alkali and/or ammonium salts and a solvent in the form of one or more phthalates.

Surprisingly, electrochromic devices comprising phthalate-based electrolyte systems have proven to fulfil the voltage stability requirements of high voltage devices. Those electrolyte systems have been found to provide excellent electrochemical voltage stability particularly for potentials in the range of 4–4.5V, superior to the stability of any other electrolyte systems known in the art.

The term "Phthalate-based electrolytes" denotes the electrolyte systems comprising an alkali and/or ammonium salt that are partly or completely dissolved in a solvent composition of one or more substances comprising one or more phthalates.

One preferred aspect of the invention covers embodiments of high voltage electrochromic devices of the invention, which has an electrolyte system comprising one single phthalate.

Another preferred aspect of the invention covers embodiments of high voltage electrochromic devices of the invention, which has an electrolyte system comprising a mixture of phthalates.

The phthalates of the present invention are preferably selected between o-phthalates, m-phthalates and p-phthalates of the general formula

wherein,
  $R_a$, $R_b$, $R_c$ and $R_d$ independently from each other represent hydrogen, $C_1$–$C_4$ alkyl, hydroxy, halogenid or alkoxy of the general formula $OR_g$, wherein $R_g$ represents $C_1$–$C_4$ alkyl, $R_1$, $R_b$, $R_c$ and $R_d$ preferably being hydrogen and
  $R_e$ and $R_f$ independently from each other represent $C_1$–$C_8$ unbranched or branched aliphates or alicyclics, preferably both of $R_e$ and $R_f$ simultaneously being ethyl or butyl,
more preferably the phthalates are o-phthalates of the above formula.

The total amount of solvents of the electrochromic devices of the present invention comprises from 10 to 100% by mole of phthalates, preferably 15 to 80% by mole of phthalates, more preferably 20 to 70% by mole of phthalates.

The electrochemical stability of phthalate-based electrolyte systems towards reduction is excellent. The improved stability towards reduction is also mirrored in the high cycling efficiency of those electrolytes.

Besides the electrochemical requirements of stability and conductivity, a number of additional demands on the electrolyte for high voltage electrochromic devices exists. The electrolyte should preferably display a good cyclability, say allow a high number of charge-discharge cycles without any performance degradation. The cyclability of the phthalate-based electrolytes has proven excellent, as electrochromic devices have been charged and discharged more than 50,000 times, mirroring the high electrochemical stability of the systems.

When no special form is explicitely mentioned the term phthalate as used herein designates any benzene dicarboxylate including the forms 1,2 ("ordinary phthalate"), 1,3 (iso-phthalate) and 1,4 (terephthalate), also respectively known as the ortho-, meta- and para-phthalates.

A further preferred aspect of the invention covers embodiments of high voltage electrochromic devices comprising an electrolyte, which has a liquid phase comprising, in addition to one or more organic phthalates, one or more additional solvents selected from organic carbonates, lactones, other esters and glymes. Such additional solvents may contribute further to the electrochemical stability and adjustment of the ionic conductivity of the electrolyte.

According to a preferred embodiment of the electrochromic devices of the invention, the electrolyte system comprises, in addition to one or more phthalates, one or more of the following additional solvents:

(a) alicyclic carbonates represented by the following general formula:

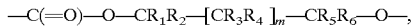

wherein each of $R_1$, $R_2$, $R_3$, $R_4$, $R_5$ and $R_6$ independently represents hydrogen or $C_1$–$C_4$ alkyl groups and m is an integer equal to 0 or 5, preferably ethylene carbonate or propylene carbonate;

(b) aliphatic carbonates represented by the general formula $R_7[OC(O)]_pOR_8$, wherein $R_7$ and $R_8$ independently represent $C_1$–$C_4$ alkyl groups, and p is an integer equal to 1 or 2, preferably dimethyl carbonate and/or diethyl carbonate;

(c) lactones in the form of cyclic esters represented by the general formula:

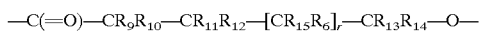

wherein each of $R_9$, $R_{10}$, $R_{11}$, $R_{12}$, $R_{13}$, $R_{14}$, $R_{15}$ and $R_{16}$ independently represents hydrogen or $C_{1-2}$ alkyl groups and r is an integer equal to 0 to 1, preferably γ-valerolactone or γ-butyrolactone;

(d) esters represented by the formula $R_{17}[C(O)]OR_{18}$ $[OR_{19}]_t$, wherein each of $R_{17}$, $R_{18}$ and $R_{19}$ independently represents hydrogen or $C_1$–$C_2$ alkyl groups, and t is an integer from 0 to 2, preferably an acetate, more preferably (2-methoxyethyl)-acetate and/or ethyl acetate;

(e) glymes represented by the general formula $R_{20}O$ $(R_{21}O)_nR_{22}$, in which $R_{20}$ and $R_{22}$ independently represent $C_{1-2}$ alkyl groups, $R_{21}$ is —$(CR_{23}R_{24}CR_{25}R_{26})_n$— wherein $R_{23}$, $R_{24}$, $R_{25}$ and $R_{26}$ independently each represent hydrogen or $C_1$–$C_4$ alkyl groups, and n is an integer from 2 to 6, preferably 3, $R_{20}$ and $R_{22}$ preferably being methyl groups, $R_{23}$, $R_{24}$, $R_{25}$ and $R_{26}$ preferably being hydrogen or $C_1$–$C_2$ alkyl groups, more preferably hydrogen.

These additional solvents of the electrolytes of electrochromic devices of the present invention are present in the total amount of solvents in from 0 to 90% by mole of the total amount of solvents, preferably 20 to 85% by mole of the solvents, more preferably 30 to 80% by mole of the solvents.

Particularly preferred combinations of phthalate(s) and additional solvent(s) are the combinations of diethyl phthalate and/or dibutylphthalate with ethylene carbonate and/or propylene carbonate. These combinations have proven surprisingly suitable for use in high voltage electrochromic devices because of the excellent voltage stability and because the conductivity of an electrolyte system based on this combination may easily be tailored to meet the below mentioned requirements of electrochromic devices.

For electrochromic devices it is a requirement that the intensity of the colour and transmission change is essentially the same at any point of the entire surface area of the electrochromic device. This is only obtainable at isopotential conditions for the complete electrolyte/electrode interphase, which requires that the conductivity of the electrolyte is adjusted according to the applied electrodes/current collectors.

The conductivity requirements for the use of the phthalate-based electrolytes in high voltage electrochromic devices further depend on the specific application and cover a broad range. However, for the majority of applications the conductivity should be in the range of $10^{-6}$–$10^{-3}$ S/cm, which is rather low compared to the required conductivity of e.g. high voltage batteries or capacitors. Therefore electrolytic compositions for use in batteries and capacitors are normally not directly applicable in electrochromic devices. By applying electrolyte systems of conductivities in said range, it is in practice possible to meet the requirement for a uniform current distribution.

The electrolyte conductivity can e.g. be controlled by adjusting the liquid phase-/polymer phase-ratio. Typically, the pure polymer electrolytes have conductivities lower than $10^{-6}$ S/cm. With such low conductivities the response time of the device will be too long. Most liquid electrolytes, have conductivities around and above $10^{-3}$ S/cm. Such high conductivities are comparable to those conductivities of the other components of the electrochromic device and will lead to non-uniform current distribution.

A preferred aspect of the invention covers embodiments of high voltage electrochromic devices comprising an electrolyte, which further comprises a polymer phase.

As a preferred alternative to the above mentioned systems the gel electrolytes comprise a liquid phase within a polymer network. Such electrolytes typically have conductivities in the range $10^{-8}$–$10^{-2}$ S/cm.

A further preferred aspect of the invention covers embodiments of high voltage electrochromic devices comprising a gel type electrolyte, having a polymer phase frame work. In these embodiments the liquid phase is immobilised within the polymer network thereof, providing improved mechanical properties.

Gelled electrolytes of conductivities in the range $10^{-6}$–$10^{-3}$ S/cm may be obtained from electrolyte compositions comprising an amount of polymer, according to preferred embodiments of the invention, of preferably from 20% to 80% by weight, preferably 30% to 80% by weight, more preferably 30% to 75% by weight, even more preferably 40% to 75% by weight, relative to the total weight of the electrolyte system.

Polymer crosslinking is a powerful tool for the control of electrolyte delamination and brittleness. Electrolyte systems of polymer and phthalate-based plasticizers can be obtained with a wide range of polymer crosslinking. Phthalate-based electrolytes are provided, which show high mechanical strength and no tendency of delamination.

The optionally included polymer phase is a crosslinked or non-crosslinked, advantageously non-crosslinked, polymer produced by UV or heat induced polymerisation, preferably UV induced polymerisation, of monomers or oligomers containing one or more polymerisable functional groups, said polymer more preferably being a non-crosslinkable polyester, polyurethane, polyether or polyacrylate.

In a preferred embodiment, the polymer is selected from acrylates, which provide excellent mechanical properties, adhesion to electrodes and transparency. Acrylates cover oligomer mono-, di- and trifunctional acrylates like polyurethane acrylates and polyether acrylates. Additionally, acrylates cover monomer acrylates, preferably of the monofunctional type like urethane acrylate.

Upon heat induced polymerisation, polymerisation is preferably performed at a temperature lower than 70° C.

The electrolyte precursor contains electrolyte salt, one or more solvents including a phthalate and the above-mentioned monomers or oligomers.

A further preferred aspect of the invention covers embodiments of high voltage electrochromic devices comprising an electrolyte system confined in a separator, improving the mechanical properties of the electrolyte.

In a preferred embodiment of the electrochromic device of the invention the electrolyte optionally containing monomers or oligomers is incorporated into a porous Em separator, optionally but preferably of the same refractive index as the electrolyte system.

In accordance hereto, the electrolyte in the high voltage electrochromic devices according to the invention is optionally incorporated in a separator consisting of a porous structure made from a polymer, preferably polyethylene, polypropylene, polycarbonate or cellulose, optionally of the same refractive index as the polymer part of the electrolyte or made from a glass fibre material e.g. boron silicate glass fibre material.

The separator acts as a matrix which confines the physical dimensions of the electrolyte system, thereby enabling the production of thin, self-sustaining and uniform electrolyte membranes. The separator is preferably a woven or non-woven structure having a pore size in the range of 10×10 nm to 1×1 mm and a thickness of 10–100 μm, preferably 10–25 μm. More specifically, the size of the pores can be as in a microporous film (e.g. a Celgard separator) or up to 1×1 mm as in a woven net having a mesh of this size.

Any salt commonly employed as an ion-conductive salt in electrochromic devices may be used in the electrolyte system according to the invention. Preferably, however, the salt is an alkali salt or a quaternary ammonium salt of $ClO_4^-$, $CF_3SO_3^-$, $AsF_6^-$, $PF_6^-$ or $BF_4^-$, or any mixture of such alkali or ammonium salts, more preferably $LiAsF_6$, $LiCF_3SO_3$, $LiPF_6$, $LiBF_4$, $N(Et)_4BF_4$ or $N(Bu)_4BF_4$ or any mixture thereof. Those salts are preferably present in the electrolyte solvents in a concentration from 0.01M to 2.5M, more preferably 0.1M to 1.5M.

The present invention furthermore relates to simple and economically advantageous methods for the preparation of the high voltage electrochromic devices of the invention. These methods comprise the steps of preparing the phthalate-based electrolyte by mixing solvents comprising at least one phthalate, dissolving the alkali or ammonium salts in the solvent mixture, optionally adding a thickening agent to the solution, and optionally adding monomers or oligomers containing one or more polymerisable functional groups, addition of a UV-photoinitiator or a heat-initiator, and UV or heat curing of the monomers or oligomers.

The high voltage electrochromic devices of the invention are finally prepared by sandwiching between the electrode laminates of the electrochromic device said phthalate-based electrolyte. Optionally the electrochromic device is further processed as it is known in the art.

It should be noted that the curing of the monomers or oligomers preferably may be performed after the phthalate-based electrolyte is incorporated into the electrochromic device.

The invention also relates to the use of a non-aqueous electrolyte comprising an alkali or ammonium salt and a solvent, wherein the solvent comprises one or more phthalates in an electrochromic device as well as the use of an electrolyte system comprising a non-aqueous electrolyte, where the non-aqueous electrolyte is confined in a porous polymer separator in an electrochromic device.

The invention will in the following be further illustrated by use of examples.

Examples I and II illustrates some of the preferred embodiments according to the invention.

EXAMPLE I 5.2 gr. of propylene carbonate (PC), 2.5 gr. of dibuthylphthalate (DBP), 16.0 gr. of urethane acrylate, 1.1 gr. of lithium trifluorosulphonate and 0.4 gr. of initiator Darocure 1173 were mixed carefully. The conductivity was measured by ac impedance spectroscopy at 65 kHz in an experimental cell with stainless steel electrodes. The conductivity was $5 \times 10^{-5}$ S/cm at 20° C. The width of the voltage stability window, i.e. the electrochemical stability range of the electrolyte was measured by cyclic voltametry at 200 mV/s in the range of 1–6 V vs. Li/Li$^+$, using a Pt-microelectrode having a radius of 5 μm. The voltage stability window was defined as the potential range at which the current did not exceeded 3 mA/cm$^2$, and was found to be 1.5–4.5V vs. Li/Li$^+$.

EXAMPLE II 4.94 gr. of ethylene carbonate (EC), 4.0 gr. of diethylphthalate (DEP), 14.75 gr. of urethane acrylate, 1.11 gr. of lithium trifluorosulphonate and 0.4 gr. of initiator Darocure 1173 were mixed carefully. The conductivity measured at 65 kHz was $5 \times 10^{-5}$ S/cm at 20° C. The width of the voltage stability window as defined above was 1.5–4.5V vs. Li/Li$^+$.

The below mentioned comparative examples IIa and IIb illustrates, that comparable conductivity properties are obtainable for other electrolyte systems, but only when compromising, i.e. decreasing, the width of the voltage stability window.

COMPARATIVE EXAMPLE IIa 6.23 gr. of ethylene carbonate (EC), 2.72 gr. of ε-caprolactone (ε-CL), 14.8 gr. of acrylate, 1.11 gr. of lithium trifluorosulphonate and 0.25 gr. of initiator Darocure 1173 were mixed carefully. The conductivity measured at 65 kHz was $6 \times 10^{-5}$ S/cm at 20° C. The width of the voltage stability window as defined above was only 2.5–4.0 V vs. Li/Li$^+$.

COMPARATIVE EXAMPLE IIb 6.24 gr. of ethylene carbonate (EC), 2.70 gr. of Ethyl-3-ethoxypropionate, 14.75 gr. of acrylate, 1.11 gr. of lithium trifluorosulphonate and 0.25 gr. of initiator Darocure 1173 were mixed carefully. The conductivity measured at 65 kHz was $7 \times 10^{-5}$ S/cm at 20° C. The width of the voltage stability window as defined above was only 2.0–4.3 V vs. Li/Li$^+$.

The examples III and IV illustrate the excellent long term voltage stability (cyclability) of some of the preferred embodiments according to the invention.

EXAMPLE III

The electrolyte of example I was sandwiched between a WO$_3$ glass electrode and a counter glass electrode, applying an electrolyte thickness of 1 mm, and subsequently UV cured for 60 s. The resulting smart window was charged and discharged between −2.2 V and +2.2 V for more than 1000 cycles with no detectable decrease in functionality.

EXAMPLE IV

The electrolyte of example II was sandwiched between a WO$_3$ glass electrode and a counter glass electrode, applying an electrolyte thickness of 1 mm, and subsequently UV cured for 60 s. The resulting smart window was charged and discharged between −2.2 V and +2.2 V for more than 50,000 cycles with no detectable decrease in functionality.

What is claimed is:

1. A high voltage electrochromic device comprising a number of electrodes, a non-aqueous electrolyte system, said system comprising one or more alkali and/or ammonium salts and a solvent in the form of one or more phthalates.

2. The electrochromic device according to claim 1 further comprising one or more additional solvents.

3. The electrochromic device according to claim 1, wherein the one or more phthalates are selected between o-phthalates, m-phthalates and p-phthalates of the general formula

wherein, $R_a$, $R_b$, $R_c$ and $R_d$ independently from each other represent hydrogen, $C_1$–$C_4$ alkyl, hydroxy, halogenid or alkoxy of the general formula OR$_g$, wherein R$_g$ represents $C_1$–$C_4$ alkyl, $R_a$, $R_b$, $R_c$ and $R_d$ preferably being hydrogen and $R_e$ and $R_f$ independently from each other represent $C_1$–$C_8$ unbranched or branched aliphates or alicyclics, preferably both of $R_e$ and $R_f$ simultaneously being ethyl or butyl, more preferably the phthalates are o-phthalates of the above formula.

4. The electrochromic device according to claim 1, wherein the total amount of solvent comprises from 10 to 100% by mole of phthalates.

5. The electrochromic device according to claim 1 wherein the electrolyte system comprises one or more of the following additional solvents (a) to (e):

(a) alicyclic carbonates represented by the following general formula:

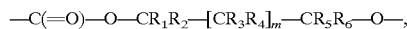

wherein each of $R_1$, $R_2$, $R_3$, $R_4$, $R_5$ and $R_6$ independently represents hydrogen or $C_1$–$C_4$ alkyl groups and m is an integer equal to 0 or 5, preferably ethylene carbonate or propylene carbonate;

(b) aliphatic carbonates represented by the general formula $R_7[OC(O)]_pOR_8$, wherein each of $R_7$ and $R_8$ independently represents $C_1$–$C_4$ alkyl groups, and p is an integer equal to 1 or 2, preferably dimethyl carbonate and/or diethyl carbonate;

(c) lactones in the form of cyclic esters represented by the general formula:

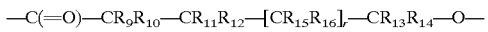

wherein each of $R_9$, $R_{10}$, $R_{11}$, $R_{12}$, $R_{13}$, $R_{14}$, $R_{15}$ and $R_{16}$ independently represents hydrogen or $C_{1-2}$ alkyl groups and r is an integer equal to 0 to 1, preferably γ-valerolactone or γ-butyrolactone;

(d) esters represented by the formula $R_{17}[C(O)]OR_{18}$ $[OR_{19}]_t$, wherein each of $R_{17}$, $R_{18}$ and $R_{19}$ independently represents hydrogen or $C_1$–$C_2$ alkyl groups, and t is an integer from 0 to 2, preferably an acetate, more preferably (2-methoxyethyl)-acetate and/or ethyl acetate;

(e) glymes represented by the general formula $R_{20}O$ $(R_{21}O)_nR_{22}$, in which each of $R_{20}$ and $R_{22}$ independently represents $C_{1-2}$ alkyl groups, $R_{21}$ is —$(CR_{23}R_{24}CR_{25}R_{26})$— wherein $R_{23}$, $R_{24}$, $R_{25}$ and $R_{26}$ independently each represents hydrogen or $C_1$–$C_4$ alkyl groups, and n is an integer from 2 to 6, preferably 3, $R_{20}$ and $R_{22}$ preferably being methyl groups, $R_{23}$, $R_{24}$, $R_{25}$ and $R_{26}$ preferably being hydrogen or $C_1$–$C_2$ alkyl groups, more preferably hydrogen.

6. The electrochromic device according to claim 5, wherein the total amount of solvent comprises one or more of the additional solvents (a) to (e) in an amount of from 0 to 90% by mole of the total amount of solvent.

7. An electrochromic device according to claim 5, wherein the total amount of solvent comprises one or more of the additional solvents (a) to (e) in an amount from 20 to 85% by mole of the total amount of solvent.

8. An electrochromic device according to claim 5, wherein the total amount of solvent comprises one or more of the additional solvents (a) to (e) in an amount from 30 to 80% by mole of the total amount of solvent.

9. The electrochromic device according to claim 1 comprising a combination of diethyl phthalate and/or dibutylphthalate with ethylene carbonate and/or propylene carbonate.

10. The electrochromic device according to claim 1, in which said salt is an alkali salt or a quaternary ammonium salt of $ClO_4$—, $CF_3SO_3$—, $LiPF_6$, $AsF_6$—, $PF_6$— or $BF_4$—, or any mixture of such alkali or ammonium salts, preferably $LiAsF_6$, $LiCF_3SO_3$ $LiBF_4$, $N(Et)_4BF_4$ or $N(Bu)_4BF_4$ or any mixture thereof.

11. The electrochromic device according to claim 10, in which said salts are present in the electrolyte solvents in a concentration from 0.01M to 2.5M.

12. The electrochromic device according to claim 10, in which said salts are present in the electrolyte solvents in a concentration from 0.1M to 1.5M.

13. The electrochromic device according to claim 1, in which the electrolyte system comprises a crosslinked or non-crosslinked, preferably non-crosslinked, polymer.

14. An electrochromic device according to claim 13, wherein said polymer is a non-crosslinked polymer, preferably a non-crosslinkable polyester, polyurethane, polyether or polyacrylate.

15. The electrochromic device according to claim 13, wherein said polymer is selected from polymerised mono-, di- and trifunctional oligomeric acrylates, preferably polyurethane acrylates and polyether acrylates, or from polymerised mono-, di- and trifunctional monomeric acrylates, preferably monofunctional monomeric acrylates, more preferably urethane acrylate.

16. The electrochromic device according to claim 13 wherein said polymer is present in an amount from 20% to 80% by weight relative to the total weight of the electrolyte system.

17. The electrochromic device according to claim 13 wherein said polymer is present in an amount from 30% to 80% by weight, relative to the total weight of the electrolyte system.

18. The electrochromic device according to claim 13 wherein said polymer is present in an amount from 30% to 75% by weight, relative to the total weight of the electrolyte system.

19. The electrochromic device according to claim 13 wherein said polymer is present in an amount from 40%. to 75% by weight, relative to the total weight of the electrolyte system.

20. The electrochromic device according to claim 1, in which the electrolyte system is confined in a separator consisting of a porous structure made from a polymer, preferably polyethylene, polypropylene, polycarbonate or cellulose or made from a glass fibre material, preferably boron silicate glass fibre material.

21. The electrochromic device according to claim 20, in which said separator has the same refractive index as the electrolyte system and/or the polymer of the electrolyte system.

22. An electrochromic device according to claim 20, in which said separator is a woven or non-woven structure having a pore size in the range of 10×10 nm to 1×1 mm.

23. The electrochromic device according to claim 20, in which said separator has a thickness of 10–100 μm.

24. A method for the preparation of a high voltage electrochromic device according to claim 20, comprising the steps of:

mixing the solvents in case the electrolyte comprises more than one solvent, the final solvent comprising one or more phthalates dissolving the alkali or ammonium salts in the solvent(s) to provide a phthalate-based electrolyte, optionally adding a thickening agent to the phthalate-based electrolyte, optionally adding monomers or oligomers having one or more polymerisable functional groups, incorporating the phthalate-based electrolyte obtained in a separator, if monomers or oligomers are added, inducing polymerisation of these monomers or oligomers and sandwiching between the electrodes of the electrochromic device said phthalate-based electrolyte to obtain an electrolyte system confined in the separator.

25. The electrochromic device according to claim 20, in which said separator has a thickness of 10–25 μm.

26. A method for the preparation of a high voltage electrochromic device according to claim 1, comprising the steps of:

mixing the solvents in case the electrolyte comprises more than one solvent, the final solvent comprising one or more phthalates, dissolving the alkali or ammonium salts in the solvent(s) to provide a phthalate-based electrolyte, optionally adding a thickening agent to the phthalate-based electrolyte, optionally adding monomers or oligomers having one or more polymerisable functional groups, if monomers or oligomers are added, inducing polymerisation of these monomers or oligomers to obtain an electrolyte system and sandwiching between the electrodes of the electrochromic device said electrolyte system.

27. The method for the preparation of a high voltage electrochromic device according to claim 26, wherein the polymerisation of the added monomers or oligomers is induced by the addition of a UV-photoinitiator or a heat-initiator and subjecting the monomers or oligomers to UV light or heat.

28. The method for the preparation of a high voltage electrochromic device according to claim 26, wherein polymerization is induced at a temperature lower than 70° C.

29. The electrochromic device according to claim 1, wherein the total amount of solvent comprises from 15 to 80% by mole of phthalates.

30. The electrochromic device according to claim 1, wherein the total amount of solvent comprises from 20 to 70% by mole of phthalates.

* * * * *